United States Patent [19]

Tsuge et al.

[11] Patent Number: 4,685,741
[45] Date of Patent: Aug. 11, 1987

[54] CHILD PASSENGER SECURING APPARATUS

[75] Inventors: Hiroshi Tsuge; Akinori Fujiwara; Noritada Yoshitsugu, all of Aichi, Japan

[73] Assignees: Kabushiki Kaisha Tokai-Rika-Denki-Seisakusho; Toyota Jidosha Kabushiki Kaisha, both of Aichi, Japan

[21] Appl. No.: 824,565

[22] Filed: Jan. 23, 1986

[30] Foreign Application Priority Data

Jan. 25, 1985 [JP] Japan ............................ 60-8847[U]

[51] Int. Cl.⁴ ............................................ A47C 31/00
[52] U.S. Cl. .................................... 297/467; 297/250
[58] Field of Search ....................... 297/250, 468, 467; 24/171, 196

[56] References Cited

U.S. PATENT DOCUMENTS

| | | | |
|---|---|---|---|
| 3,162,864 | 12/1964 | Ouellette | 297/468 X |
| 3,709,558 | 1/1973 | Jakob | 297/250 |
| 3,912,328 | 10/1975 | Tanaka | 24/196 |
| 3,922,035 | 11/1975 | Wener | 297/250 |
| 4,131,976 | 1/1979 | Bengtsson | 24/196 |
| 4,402,548 | 9/1983 | Mason | 297/250 X |
| 4,462,607 | 7/1984 | Nakao et al. | 24/196 X |
| 4,473,926 | 10/1984 | Ono | 24/196 |
| 4,551,889 | 11/1985 | Narayan et al. | 24/196 |

Primary Examiner—Peter A. Aschenbrenner
Attorney, Agent, or Firm—Sixbey, Friedman & Leedom

[57] ABSTRACT

A child passenger securing apparatus includes an apparatus body which is provided with a child passenger restraining webbing. One end of the webbing is led into the inside of the body, passed through a through-hole provided in a fixed plate, passed over an engaging portion of a lock plate and then turned up in such a manner that its direction is reversed, and is then passed through the through-hole again in the opposite direction. Accordingly, the fixed and lock plates are disposed below the seat portion of the apparatus body, and this allows the surface of the seat portion to be flattened. Since the lock plate is slidable along the fixed plate, the tension which acts on the webbing causes the lock plate to slide relative to the fixed plate so as to clamp an intermediate portion of the webbing, and the webbing tension is thereby reliably born.

19 Claims, 4 Drawing Figures

CHILD PASSENGER SECURING APPARATUS

BACKGROUND OF THE INVENTION

1. Field of the Invention

The present invention relates to a child passenger securing apparatus for use in a vehicle which is designed to protect a child passenger by restraining his body.

2. Description of the Related Art

Most road vehicles are provided with a restraining webbing for fastening an occupant seated in a seat.

Since this type of restraining webbing is generally disposed with a view to being used by an adult passenger when he is seated, the disposition of the webbing is not always appropriate for a child passenger.

In order to overcome the above disadvantage, child passenger securing apparatuses have already been proposed wherein the apparatus body is mounted on a seat of a vehicle and secured to the seat by a restraining webbing, and a child passenger is seated in this body and fastened by a restraining means, exclusively for a child passenger, which is provided on the apparatus body so that he is protected in an appropriate condition.

These proposed conventional child passenger securing apparatuses, however, suffer from various disadvantages. For example, one type of conventional apparatus has no adjusting means for adjusting the effective length of the restraining means in accordance with the body dimensions of the child passenger seated therein, and another type which is provided with length adjusting means has a structure in which the adjusting means inconveniently projects into the child passenger seating area, e.g., the seat portion or backrest portion of the apparatus body.

SUMMARY OF THE INVENTION

In view of the above circumstances, it is a primary object of the present invention to provide a child passenger securing apparatus which is provided with adjusting means for adjusting the effective length of the restraining means, the adjusting means not projecting into the child passenger seating area.

To this end, the present invention provides a child passenger securing apparatus in which one longitudinal end of restraining means is passed through a through-hole in a fixed plate provided inside the apparatus body, passed over a lock plate which is slidable relative to the fixed plate, and then turned up in such a manner that its direction is reversed, the end of the restraining means then being passed through the through-hole again from the inside of the body and further passed through the area between the fixed plate and the intermediate portion of the restraining means before being led out.

By virtue of this arrangement, it is possible to reliably retain the end portion of the restraining means at a portion of the apparatus body, e.g., the seat portion or backrest portion thereof and also to facilitate the adjustment of the effective length of the restraining means.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and in which.

DESCRIPTION OF THE PREFERRED EMBODIMENT

Figure 1:
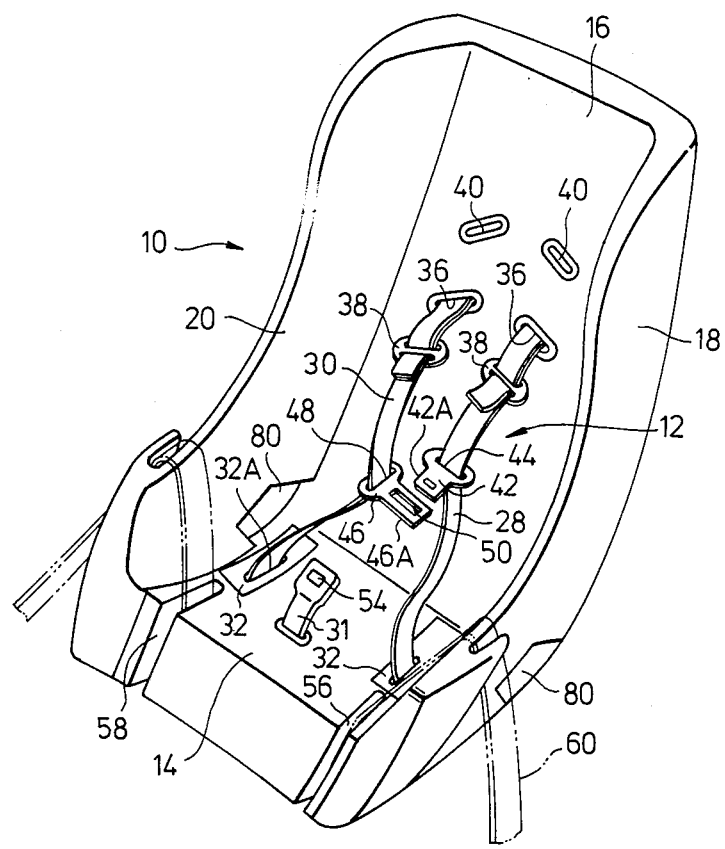
FIG. 1 is a perspective view of a child passenger securing apparatus in accordance with one embodiment of the present invention, which shows the way in which the apparatus is secured.

Referring first to FIG. 1, a child passenger securing apparatus in accordance with one embodiment of the present invention includes a body 10 which is provided with a child passenger restraining webbing 12 serving as a restraining means.

The body 10 is composed of a seat portion 14, a backrest portion 16 and a pair of side walls 18, 20, which are integrally molded from, for example, a synthetic resin.

The seat portion 14 is mounted on a seat of a vehicle, while the backrest portion 16 is disposed in such a manner as to abut against the seat back of the seat.

The child passenger restraining webbing 12 includes a pair of continuous webbing straps 28, 30 and a buckle device 31. One end of each of the webbing straps 28 and 30 is led into the inside of the seat portion 14 and is retained by anchor means. This anchor means will be described below with respect to the webbing strap 28 as one example and with reference to FIGS. 2 to 4.

The lower end of the webbing strap 28 is passed through an opening 32A in a cover plate 32 secured to the seat portion 14 and is led into a recess 14A formed in the seat portion 14 so as to serve as an accommodating portion. A fixed plate 33 is disposed inside the seat portion 14 such that the projecting portion of the plate 33 extends into the recess 14A. The lower end of the webbing strap 28 is passed through a through-hole 33A provided in the projecting portion of the fixed plate 33 and is then looped over so as to pass through the through-hole 33A again in the opposite direction. Then, the distal end portion 28A of the webbing strap 28 is passed through the area between an intermediate portion of the strap 28 and the projecting portion of the plate 33 and further passed through the opening 32A before being led out to the surface of the seat portion 14.

A lock plate 34 is provided adjacent to the through-hole 33A. Plate 34 is slidably movable relative to the fixed plate 33. The end portion of the webbing strap 28 is looped over an engaging portion 34A of the lock plate 34. Whenever tension is applied to the webbing strap 28, movement of the lock plate 34 along the direction of arrow A is limited by the fixed plate 33, which not only acts as a stop, but also acts as a clamp against the looped portion of the strap 28. More specifically, when tension acts on the webbing strap 28 in the direction of the arrow A in FIG. 3, an intermediate portion of the strap 28 clamps the end portion thereof between the fixed plate 33 and an edge of the through-hole 33A. Because there is no risk of the looped portion of the webbing strap 28 from being pulled out in the direction of the arrow A due to the clamping action of lock plate 34, the locked state of the strap 28 is reliably maintained. If the tension acting on the webbing strap 28 in the direction of the arrow A is removed, the lock plate 34 becomes disengaged from its clamping position against the strap 28, and the strap 28 can be moved around the engaging portion 34A, thus enabling the effective length of the strap 28 to be readily adjusted.

The lock plate 34 is received through the opening 33B provided in the fixed plate 33 as a result of the formation of the projecting portion of the plate 33. The fixed plate 33 has two end portions thereof abutting against the underside of the seat portion 14 and secured thereto by rivets 33C in such a manner that the projecting portion extends into the recess 14A from an opening provided in the seat portion 14.

Since this retaining structure for retaining the webbing strap 28 is disposed inside the seat portion 14, there is no obstruction to the child passenger seated in the seat portion 14.

It is to be noted that a support member 32B projects downwardly from the underside of the cover plate 32 so as to abut against the bottom surface of the recess 14A of the seat portion 14.

The other ends of the webbing straps 28 and 30 are passed through respective openings 36 provided in the backrest portion 16 so that they are led out to the rear side of the backrest portion 16, and are passed over anchor means (not shown) provided at the rear side of the portion 16 and then turned up in such a manner that their direction is reversed. These ends of the straps 28 and 30 are then led out to the front side of the backrest portion 16 and are retained by respective length adjusting means 38, whereby the respective upper end portions of the webbing straps 28 and 30 are retained and prevented from being pulled out toward the front side of the backrest portion 16. The backrest portion 16 is provided with openings 40 in addition to the openings 36 for the purpose of enabling the retained positions of the webbing straps 28 and 30 to be changed in accordance with the body dimensions of a child passenger seated in the seat portion 14.

The anchor means which is disposed at the rear of the backrest portion 16 may have an arrangement similar to that of the anchor means (shown in FIGS. 2 and 3) provided inside the seat portion 14.

The intermediate portion of the webbing strap 28 is passed through a slot 44 provided in a tongue plate 42, whereby the tongue plate 42 is retained by the webbing strap 28 in such a manner as to be movable in the longitudinal direction of the strap 28. A buckle engaging projection 42A projects from the tongue plate 42.

Similarly, the intermediate portion of the webbing strap 30 is passed through a slot 48 provided in a tongue plate 46, whereby the tongue plate 46 is retained by the webbing strap 30 such as to be movable longitudinally of the strap 30. A connecting projection 46A projects from the tongue plate 46. A slot 50 for passing the buckle engaging projection 42A therethrough is provided in the projection 46A.

The buckle device 31 is provided so as to project from the surface of the seat portion 14. The buckle device 31 is provided therein with a lock mechanism (not shown) for locking tho buckle engaging projection 42A of the tongue plate 42. Thus, when inserted into the buckle device 31, the buckle engaging projection 42A is retained by the lock mechanism. A release button 54 is provided on the buckle device 31. When an occupant presses the release button 54, the retaining of the tongue plate 42 by the buckle device 31 is cancelled.

Accordingly, when the buckle engaging projection 42A of the tongue plate 42 is passed through the slot 50 of the tongue plate 46 and is then inserted into the buckle device 31, the child passenger seated in the seat portion 14 can be brought into a five-point webbing fastened condition. More specifically, the child passenger 26 is fastened by the child passenger restraining webbing 12 in such a manner that a portion of the webbing strap 28 between the opening 36 and the tongue plate 42 and a portion of the webbing strap 30 between the opening 36 and the tongue plate 46 serve as a pair of shoulder webbings; a portion of the webbing strap 28 between the tongue plate 42 and the seat portion 14 and a portion of the webbing strap 30 between the tongue plate 46 and the seat portion 14 serve as a pair of lap webbings; and the buckle device 31 functions as a crotch belt.

A pair of slits 56 and 58 are respectively provided in two lateral end portions of the seat portion 14 in accordance with this embodiment. Each of the slits 56 and 58 has a rectangular planar configuration and is communicated with the outside at the front end face of the seat portion 14, that is, at the end of the seat portion 14 on the side thereof which is closer to the front end of the vehicle when the body 10 is actually mounted on the seat of the vehicle.

Accordingly, when the intermediate portion of an adult passenger restraining webbing 60, which is provided on the seat of the vehicle, is passed through these slits 56 and 58, the intermediate portion of the webbing 60 is disposed below the child passenger seated in the seat portion 14 and is not exposed at the upper surface of the seat portion 14.

A through-hole 80 is provided in each of the side walls 18 an 20 and at the joint between the seat portion 14 and the backrest portion 16, so that it is possible to pass the adult passenger restraining webbing 60 therethrough when necessary.

The following is a description of the operation of this embodiment.

The body 10 of the child passenger sucuring apparatus is mounted on and secured to the seat of the vehicle by means of the adult passenger restraining webbing 60. The intermediate portion of the webbing 60 passes underneath the seat portion 14. Therefore, the child passenger seated in the seat portion 14 is not in contact with the webbing 60, and this allows the child passenger to be seated in a comfortable condition during running of the vehicle.

After the child passenger has been properly seated in the seat portion 14, the webbing straps 28 and 30 are disposed on the front side of his body, and the buckle engaging projection 42A is passed through the slot 50 and then engaged with the buckle device 31, whereby the child passenger is fastened by the webbing straps 28 and 30. Since the adult passenger restraining webbing 60 does not extend in front of the child passenger, his freedom is not restricted by the webbing 60.

Figure 2:
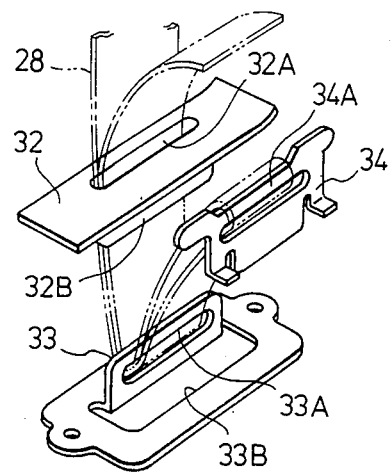
FIG. 2 Is an exploded view of an essential portion of the apparatus shown in FIG. 1, which particularly illustrates one of the webbing retaining portions of the apparatus.
Figure 3:
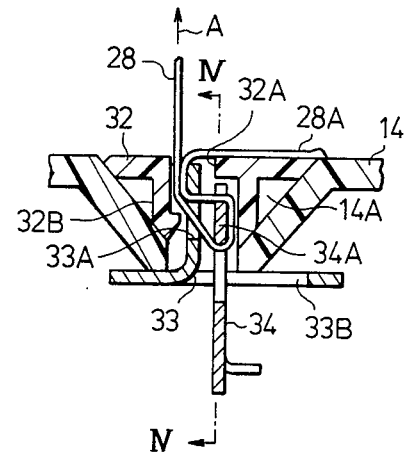
FIG. 3 is a sectional view of the webbing retaining portion shown in FIG. 2 in its assembled state.
Figure 4:
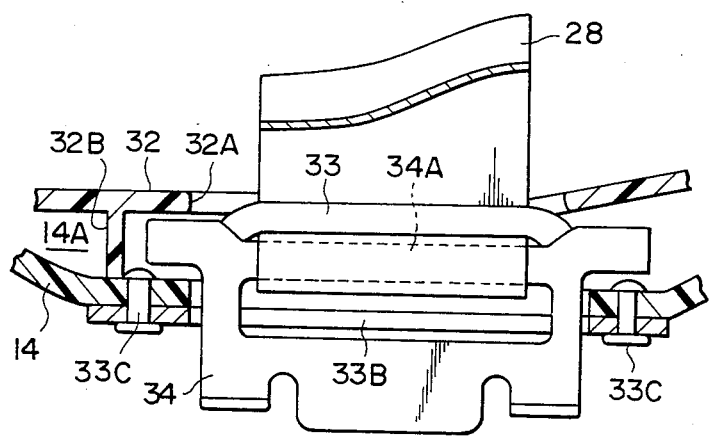
FIG. 4 is a sectional view taken along the line IV—IV of FIG. 3.

In the case where the effective length of each of the webbing straps 28 and 30 needs to be adjusted in accordance with the body dimensions of the child passenger seated in the seat portion 14, the anchor means shown in FIGS. 2 and 3 is utilized. More specifically, with the tension acting on the webbing strap 28 (30) removed, the distal end portion 28A is moved either toward the intermediate portion of the strap 28 or in the opposite direction through the turned portion which is passed over the engaging portion 34A, whereby it is possible for the effective length of the strap 28 to be readily aijusted as desired.

When an emergency situation of the vehicle occurs, the webbing straps 28 and 30 restrain and secure the body of the child passenger. In such a case, the securing of the child passenger's body is reliably effected, since the body 10 of the securing apparatus is rigidly and reliably secured to the seat base and the seat back by means of the adult passenger restraining webbing 60. The tension which is applied to the strap 28 (30) acts as a force which pulls an end portion of the webbing strap 28 which is clamped between the intermediate portion of the strap 28 and the fixed plate 33 toward the distal end portion 28A of the strap 28, as shown in FIG. 3. There is therefore no risk of an extra amount of the strap 28 being pulled out toward the portion thereof which retains the body of the child passenger.

When the child passenger is to leave the vehicle, it is only necessary to press the release button 54. In other words, when the webbing straps 28 and 30 are unfastened, it is possible for the child passenger to leave the vehicle irrespective of whether or not the adult passenger restraining webbing 60 is unfastened. For this reason, when the child passenger enters the vehicle the next time, it is only required to engage the buckle engaging projection 42A with the buckle device 31 after he has been seated in the seat portion 14. Thus, the operation is extremely simple.

What is claimed is:

1. A child passenger securing apparatus which includes a seat body provided with a seat portion and a restraining webbing having a distal end portion, said seat body being mounted on a seat of a vehicle and secured thereto by means of an occupant restraining webbing provided by the vehicle, and said seat portion having an opening for passing an intermediate portion of said restraining webbing, said apparatus comprising:
    (a) a fixed plate provided inside said body and having a through-hole in registry with the opening of the seat portion for passing said restraining webbing;
    (b) a cover plate for covering the opening in the seat portion of the body, wherein said cover plate is receivable within a recess that circumscribes said opening in order to provide a flat, continuous surface around said opening;
    (c) a lock plate disposed inside said apparatus body so as to be slidably movable relative to said fixed plate and having a portion for engaging said restraining webbing, wherein said restraining webbing is fastened over the child passenger seated in said body, the distal end of which passes through the opening in the seat portion, and the through-hole of said fixed plate, and loops over the engaging portion of said lock plate and which then passes through said through-hole again between said fixed plate and said lock plate, so that when tension is applied on said restraining webbing, the distal end portion of said restraining webbing is clamped between said lock plate and said fixed plate, whereby the child passenger is restrained and secured by said webbing.

2. A child passenger securing apparatus according to claim 1, wherein said fixed plate is disposed inside said seat body and has a projecting portion integrally projecting therefrom and provided with said through-hole, said projecting portion being disposed within said recess in said seat portion, whereby the tension which acts on said restraining webbing is transmitted to said seat body through said fixed plate so as to be borne thereby.

3. A child passenger securing apparatus according to claim 2, wherein said projecting portion is formed by cutting and raising a portion of said fixed plate.

4. A child passenger securing apparatus according to claim 3, wherein said lock plate is accommodated within an opening which is provided in said fixed plate as a result of the formation of said projecting portion by cutting and raising a portion of said fixed plate.

5. A child passenger securing apparatus according to claim 1, wherein the end portion of said restraining webbing is admitted out to the surface of said seat portion from the opening provided in said cover plate.

6. A child passenger securing apparatus mounted on a vehicle for protecting a child passenger, said apparatus comprising:
    (a) a seat body having a seat portion for a child passenger which is mounted on and secured to a seat of the vehicle;
    (b) a fixed plate secured within a recess formed in said seat body and having a through-hole for receiving a restraining webbing;
    (c) a lock plate slidable relative to said fixed plate and having a webbing engaging portion, and
    (d) a child passenger restraining webbing provided on said body and having one end thereof which is inserted through said through-hole of said fixed plate, looped around said webbing engaging portion and then passed through said through-hole again in a direction opposite to the direction of insertion so that said end is disposed between said lock plate and aid fixed plate, whereby a tensile force applied to the restraining webbing by the child passenger will cause said end of said webbing to become clampingly secured between said lock plate and said fixed plate.

7. A child passenger securing apparatus according to claim 6, further including a cover plate for covering the recess so that the surface of the seat portion is substantially flat and continuous in the vicinity of the through-hole, wherein said cover plate includes an opening for passing said webbing therethrough.

8. A child passenger securing apparatus according to claim 6, wherein a projecting portion which projects from said fixed plate disposed inside said body extends into said recess, said through-hole being provided in said projecting portion.

9. A child passenger securing apparatus according to claim 8, wherein said projecting portion is formed by cutting and raising a portion of said fixed plate.

10. A child passenger securing apparatus according to claim 9, wherein said lock plate is accommodated within an opening which is provided in said fixed plate as a result of the formation of said projecting portion by cutting and raising a portion of said fixed plate.

11. A.child passenger securing apparatus according to claim 6, wherein a support member projects from the underside of said cover plate so as to abut against the bottom surface of said recess.

12. An apparatus for seating and securing a child passenger, comprising:
    a seat body having a seat portion for a child passenger, and an opening for admitting a webbing;
    a fixed plate accommodated inside said seat body and having a through-hole aligned with the opening of the seat body;
    a lock plate slidable relative to said fixed plate and having a webbing engaging portion that is larger than the through-hole of the fixed plate; and a webbing fastened around the child passenger seated in said seat portion, said webbing having one end portion thereof which is inserted through the opening of the seat portion and into the inside of said seat body, inserted through said through-hole of said lock plate, looped over asid webbing engaging portion and then inserted through said through-hole again so that said end portion becomes disposed in part between said fixed plate and said lock plate so that a tensile force applied to the webbing by the child passenger causes the end portion of the webbing to become clampingly secured between the lock plate and the fixed plate.

13. An apparatus according to claim 12, wherein said fixed and lock plates are accommodated below the seat portion of said apparatus body.

14. An apparatus according to claim 13, wherein said fixed and lock plates are accommodated within a recess formed in said apparatus body, said recess being covered by a cover plate.

15. An apparatus according to claim 14, wherein said cover plate is provided with an opening for passing said webbing therethrough.

16. An apparatus according to claim 12, wherein a projecting portion which projects from said fixed plate disposed inside said body extends into said recess, said through-hole being provided in said projecting portion.

17. An apparatus according to claim 16, wherein said projecting portion is formed by cutting and raising a portion of said fixed plate.

18. An apparatus according to claim 17, wherein said lock plate is accommodated within an opening which is provided in said fixed plate as a result of the formation of said projecting portion by cutting and raising a portion of said fixed plate.

19. An apparatus according to claim 12, wherein a support tube projects from the underside of said cover plate so as to abut against the bottom surface of said recess.

* * * * *